(12) United States Patent
Howell, Sr. et al.

(10) Patent No.: US 10,267,102 B2
(45) Date of Patent: Apr. 23, 2019

(54) BALL SOCKET CONNECTOR

(71) Applicants: William R. Howell, Sr., Fort Worth, TX (US); Sohail Shad, Arlington, TX (US)

(72) Inventors: William R. Howell, Sr., Fort Worth, TX (US); Sohail Shad, Arlington, TX (US)

( * ) Notice: Subject to any disclaimer, the term of this patent is extended or adjusted under 35 U.S.C. 154(b) by 259 days.

(21) Appl. No.: 15/298,730

(22) Filed: Oct. 20, 2016

(65) Prior Publication Data
US 2018/0112473 A1    Apr. 26, 2018

(51) Int. Cl.
| | |
|---|---|
| *E21B 17/20* | (2006.01) |
| *E21B 17/04* | (2006.01) |
| *F16L 27/00* | (2006.01) |
| *F16L 27/02* | (2006.01) |
| *F16L 27/04* | (2006.01) |

(52) U.S. Cl.
CPC .............. *E21B 17/20* (2013.01); *E21B 17/04* (2013.01); *F16L 27/00* (2013.01); *F16L 27/02* (2013.01); *F16L 27/04* (2013.01)

(58) Field of Classification Search
CPC ........ E21B 17/20–17/206; E21B 17/04; E21B 17/05; E21B 17/00; E21B 19/22; F16L 27/1017; F16L 27/00–27/125
See application file for complete search history.

(56) References Cited

U.S. PATENT DOCUMENTS

| | | | | |
|---|---|---|---|---|
| 1,665,810 | A * | 4/1928 | Gillick | F16L 27/044 |
| | | | | 277/618 |
| 5,306,050 | A * | 4/1994 | Laflin | E21B 17/04 |
| | | | | 285/119 |
| 2008/0066961 | A1 * | 3/2008 | Aivalis | E21B 4/02 |
| | | | | 175/50 |
| 2016/0076684 | A1 * | 3/2016 | Coutts | F16L 11/20 |
| | | | | 285/261 |

* cited by examiner

*Primary Examiner* — George S Gray
(74) *Attorney, Agent, or Firm* — Sterne, Kessler, Goldstein & Fox P.L.L.C.

(57) ABSTRACT

A coiled tubing system includes a first section of coiled tubing, a second section of coiled tubing, a first insert assembly attached at an end of the first section of coiled tubing, a second insert assembly attached at an end of the second section of coiled tubing, and a connector disposed between the first and second sections of coiled tubing and removably coupled to the first and second insert assemblies. A portion of the connector is configured to pivot with respect to a longitudinal axis of the connector.

21 Claims, 12 Drawing Sheets

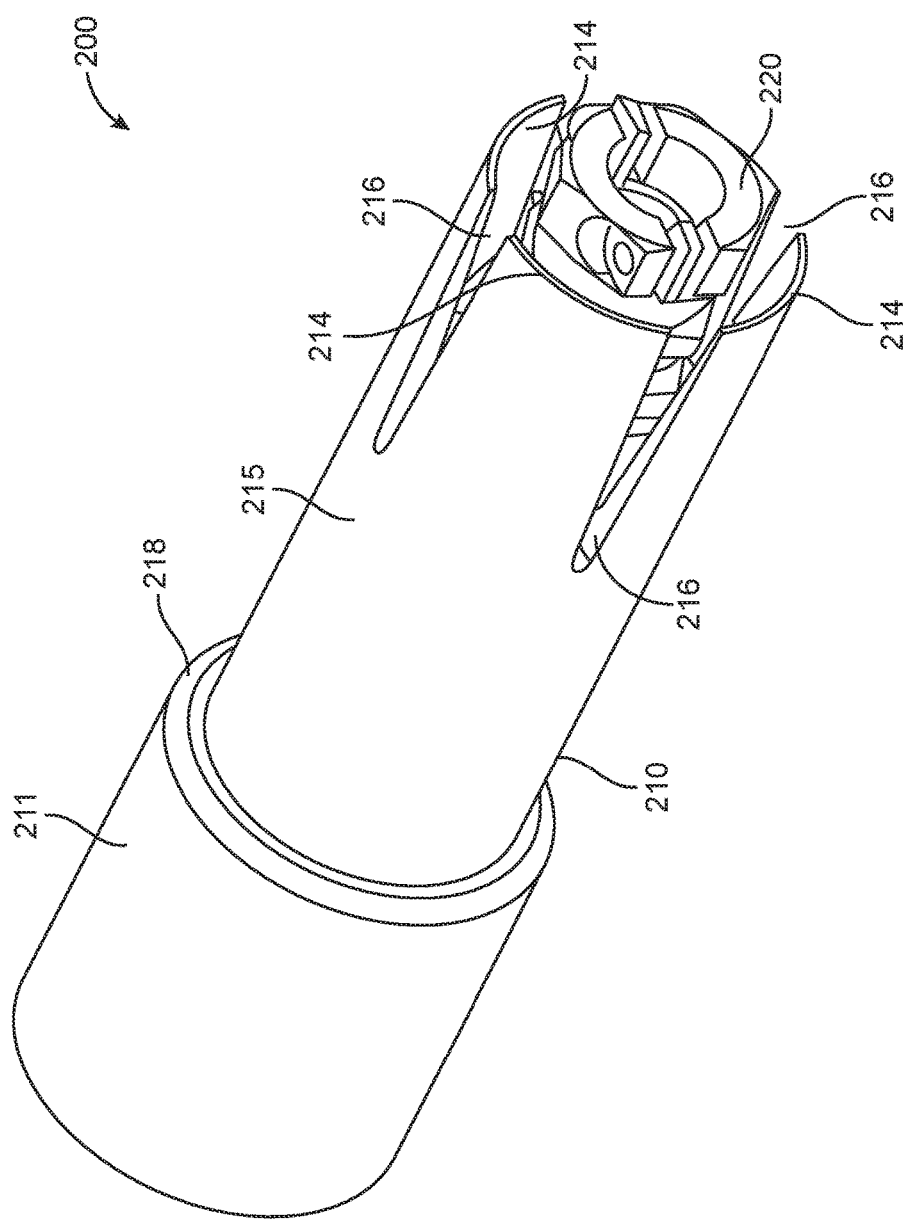

BALL SOCKET CONNECTOR

BACKGROUND

Field

The present disclosure relates to coiled tubing systems, methods, and components for a drilling well. More specifically, the present disclosure relates to a ball socket connector and insert assemblies that removably connect sections of coiled tubing used in downhole tool delivery systems for drilling wells.

Background

Downhole tools, such as pumps, are used in drilling wells for various purposes, such as forming the well, evaluating the well, recovering resources from the well, fracturing, and so on. Coiled tubing is often used to install or remove a downhole tool from a drilling well. For example, a downhole tool can be attached at the end of a continuous coiled tubing reel and placed downhole in the drilling well. However, this approach does not allow for tools to be installed at various points along a length of coiled tubing because the coiled tubing is continuous with only one connector at the end of a reel of the coiled tubing.

Installing downhole tools at various points along a length of coiled tubing and attaching sections of coiled tubing together currently requires skilled and certified welders and expensive equipment. These methods are not conducive to quickly attaching and detaching sections of coiled tubing on site, or to quickly installing downhole tools at various points along the length of a coiled tubing reel. Being able to install tools in between the coiled tubing as the tubing comes off the reel would open up many new applications for coiled tubing in drilling wells, such as those in the oil and gas industry.

BRIEF SUMMARY

The present disclosure details a coiled tubing system for a drilling well. A coiled tubing system may include a first section of coiled tubing, a second section of coiled tubing, a first insert assembly attached at an end of the first section of coiled tubing, a second insert assembly attached at an end of the second section of coiled tubing, and a connector disposed between the first and second sections of coiled tubing and removably coupled to the first and second insert assemblies. In some embodiments, a portion of the connector may pivot with respect to a longitudinal axis of the connector.

In some embodiments, the coiled tubing system may include a third insert assembly attached at an opposite end of the second section of coiled tubing from the second insert assembly, a third section of coiled tubing, a fourth insert assembly attached at an end of the third section of coiled tubing, and a second connector disposed between the second and third sections of coiled tubing and removably coupled to the third and fourth insert assemblies. In some embodiments, a portion of the second connector may pivot with respect to a longitudinal axis of the second connector.

In some embodiments, the connector may include a ball socket connector. In some embodiments, the portion of the connector configured to pivot may include an arm and a ball socket joint. In some embodiments, the portion of the connector configured to pivot may include each end of the connector. In some embodiments, each end of the connector may be configured to pivot up to 18 degrees with respect to the longitudinal axis of the connector. In some embodiments, each end of the connector may be configured to pivot up to 9 degrees with respect to the longitudinal axis of the connector.

In some embodiments, an outer diameter of the first and second sections of coiled tubing, an outer diameter of the first and second insert assemblies, and an outer diameter of the connector may be equal.

In some embodiments, the first and second insert assemblies may each include a tapered first end configured to be disposed within the coiled tubing, a second end configured to receive the connector, and a swiveling insert disposed within the insert assembly. In some embodiments, the swiveling insert may have an electrical connector and an alignment element disposed adjacent the second end. In some embodiments, the second end may be configured to receive a downhole tool for a drilling well.

A connector for joining sections of coiled tubing may include a ball socket joint, an arm attached to the ball socket joint, and a nut disposed around the arm. In some embodiments, the ball socket joint may include a casing having a recess, a ball disposed in the recess, and a cap configured to secure the ball within the recess. In some embodiments, the ball may be configured to move within the recess relative to the cap and the casing. In some embodiments, the nut may removably attach to a section of coiled tubing.

In some embodiments, the connector may include an electrical connector disposed at a first end of the arm opposite the ball socket joint. In some embodiments, the arm may include a shoulder.

In some embodiments, the nut may translate axially along the arm between the ball socket joint and the shoulder. In some embodiments, the nut may rotate around the arm. In some embodiments, the nut may removably attach to a section of coiled tubing via an insert assembly that is partially disposed in the section of the coiled tubing. In some embodiments, the nut may include threading configured to mate with threading on the insert assembly.

In some embodiments, the arm may include an alignment element disposed at a first end of the arm. In some embodiments, the alignment element may provide a blind connection between the connector and a section of coiled tubing.

In some embodiments, the arm may rotate on a longitudinal axis of the arm. In some embodiments, the arm may pivot up to 9 degrees in any direction with respect to a longitudinal axis of the connector.

A method of preparing coiled tubing for use in a drilling well may include attaching a first insert assembly to a first section of coiled tubing, attaching a second insert assembly to a second section of coiled tubing, attaching a connector that includes a ball socket joint to the first insert assembly and the second insert assembly, and spooling the first section of coiled tubing, the connector, and the second section of coiled tubing onto a reel.

In some embodiments, the connector may provide electrical continuity between the first and second sections of coiled tubing. In some embodiments, attaching the first insert assembly to the first section of coiled tubing may include welding the first insert assembly to the first section of coiled tubing. In some embodiments, attaching the second insert assembly to the second section of coiled tubing may include welding the second insert assembly to the second section of coiled tubing. In some embodiments, attaching the connector to the first insert assembly and the second insert assembly may include removably attaching the connector to the first insert assembly and the second insert assembly.

In some embodiments, the method may include passing the first section of coiled tubing, the connector, and the second section of coiled tubing through an injector. In some embodiments, the method may include unspooling the first section of coiled tubing, the connector, and the second section of coiled tubing. In some embodiments, the method may include replacing the connector with a downhole tool for a drilling well.

BRIEF DESCRIPTION OF THE DRAWINGS/FIGURES

The accompanying figures, which are incorporated herein, form part of the specification and illustrate embodiments of downhole pump systems and components thereof. Together with the description, the figures further serve to explain the principles of and allow for the making and using of the embodiments described herein. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIG. 6 illustrates an insert assembly for a coiled tubing system according to some embodiments.

DETAILED DESCRIPTION

While the disclosure refers to illustrative embodiments, it should be understood that the disclosure is not limited thereto. Modifications can be made to the embodiments described herein without departing from the spirit and scope of the present disclosure. Those skilled in the art with access to this disclosure will recognize additional modifications, applications, and embodiments within the scope of this disclosure and additional fields in which the disclosed examples could be applied. Therefore, the following detailed description is not meant to be limiting.

Further, it is understood that the devices and methods described herein can be implemented in many different embodiments of hardware. Any actual hardware described is not meant to be limiting. The operation and behavior of the devices, systems, and methods presented are described with the understanding that modifications and variations of the embodiments are possible given the level of detail presented.

The coiled tubing system disclosed herein allows for quickly attaching and detaching sections of coiled tubing on site, as well as quickly installing downhole tools at various points along the length of a coiled tubing reel. In addition, the coiled tubing system disclosed herein can be spooled onto a reel.

In some embodiments, the coiled tubing system includes a plurality of sections of coiled tubing, insert assemblies, and connectors. Two sections of coiled tubing may be attached to each other via two insert assemblies and a connector. For example, an insert assembly may be attached to each end of a section of coiled tubing (e.g., by welding). The insert assemblies and the connectors may be configured to be removably coupled to each other. For example, both the insert assemblies and the connectors may be threaded.

Thus, the connectors may be disposed at various points along the length of a coiled tubing reel. Because the insert assemblies and the connectors are removably coupled to each other, the connectors may be easily and quickly removed from the coiled tubing system and replaced with a downhole tool.

In some embodiments, the connectors are configured to pivot so as to facilitate spooling the coiled tubing system onto a reel. For example, the connectors may be ball socket connectors. A ball socket connector may include a ball socket joint so that an end of the ball socket connector may pivot with respect to a longitudinal axis of the ball socket connector. In some embodiments, a ball socket connector may include two ball socket joints so that each end of the ball socket connector may pivot with respect to a longitudinal axis of the ball socket connector. Thus, the coiled tubing system can be spooled onto a reel while minimizing the amount of stress induced in the sections of coiled tubing.

Figure 1:
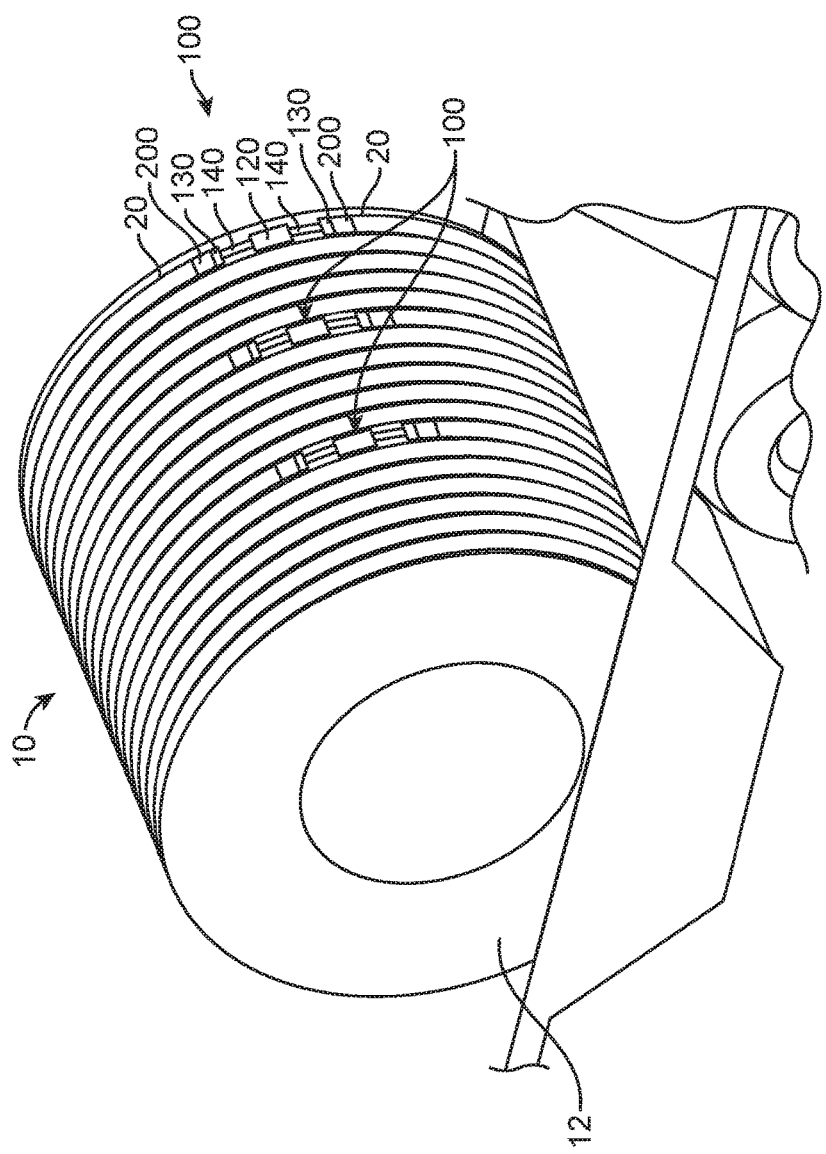
FIG. 1 illustrates a coiled tubing system on a reel according to some embodiments.

A coiled tubing system 10, as shown, for example, in FIG. 1, may include a plurality of sections of coiled tubing 20 and a connector 100, such as a ball socket connector. In some embodiments, two sections of coiled tubing 20 are connected to each other via connector 100. In some embodiments, connector 100 connects two opposing sections of coiled tubing 20 via a threaded connection. In some embodiments, connector 100 maintains electrical continuity across each connected section of coiled tubing 20. A plurality of connectors 100 may be used to connect a series of sections of coiled tubing 20. In some embodiments, coiled tubing system 10 may be between 3,000 and 12,000 feet in length (e.g., 10,000 feet). In some embodiments, each section of coiled tubing may have an outer diameter of between 1 and 3.5 inches (e.g., 2.625 inches).

Figure 2:
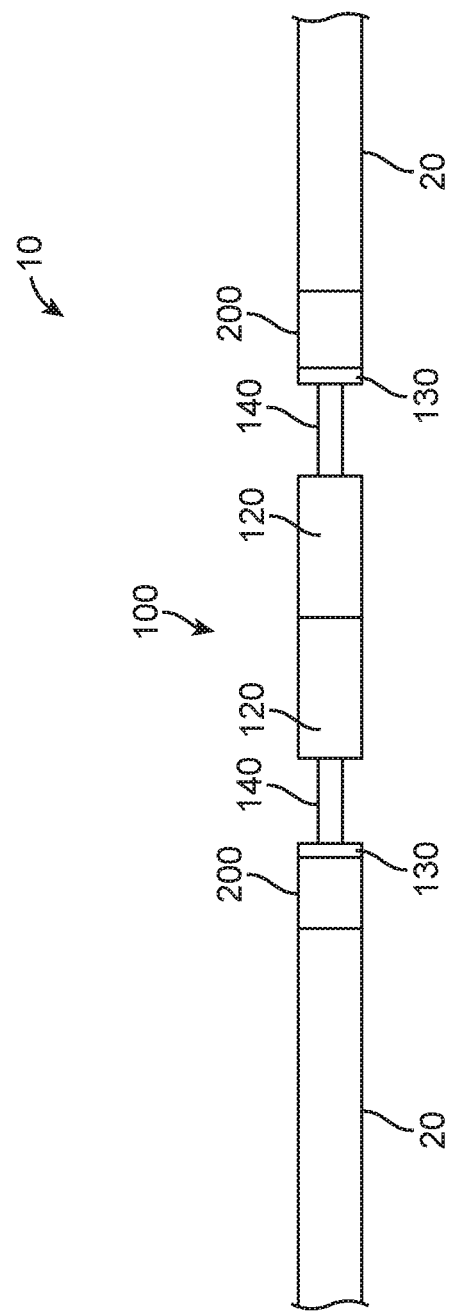
FIG. 2 illustrates a coiled tubing system according to some embodiments.
Figure 10:
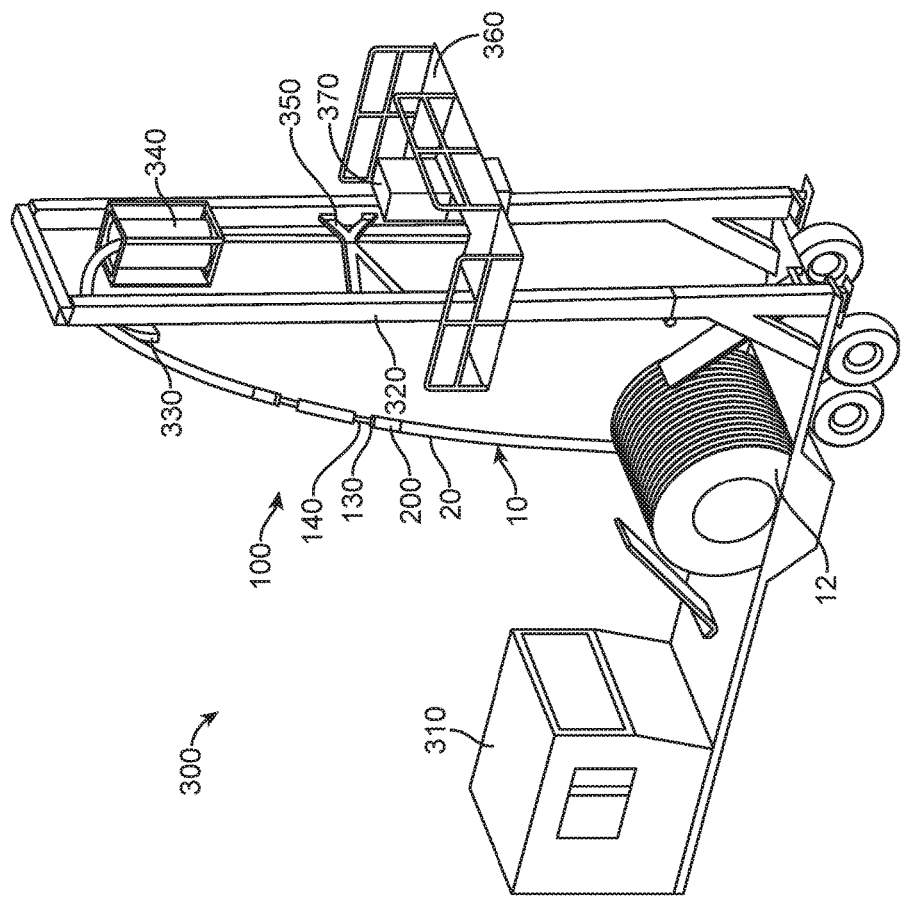
FIG. 10 illustrates a coiled tubing system on a work service rig according to some embodiments.

In some embodiments, coiled tubing system 10 may be spooled onto a reel 12. In some embodiments, connector 100 may pivot up to 18 degrees (i.e., 9 degrees on each side) before connector 100 is put under bending stress or strain. As used herein, "pivot" does not mean that the material of connector 100 is actually flexing or bending, but rather that a portion of connector 100 changes angle with respect to another portion of connector 100 or to a longitudinal axis of connector 100, as explained in more detail below. For example, while FIG. 2 shows a threaded nut 130 and an arm 140 on each end of connector 100 as straight relative to a cap 120 of connector 100 (i.e., no angle), FIG. 1 shows an angle between arm 140 and cap 120 of connector 100. In some embodiments, connector 100 may pivot up to 36 degrees (i.e., 18 degrees on each side) before connector 100 is put under bending stress or strain. In some embodiments, this ability to flex or pivot allows connected sections of coiled tubing 20 to be spooled onto reel 12 (see FIG. 1), pass over a gooseneck track 330, and pass through an injector 340 (see FIG. 10).

In some embodiments, coiled tubing system 10 includes insert assemblies 200. In some embodiments, an insert assembly 200 is attached to each end of sections of coiled tubing 20. In some embodiments, insert assembly 200 is welded to an end of sections of coiled tubing 20. In some embodiments, connector 100 connects two sections of coiled tubing 20 by threading into insert assemblies 200. For example, threaded nuts 130 may interface with insert assemblies 200, as shown in FIGS. 1 and 2. In some embodiments, insert assembly 200 houses electrical connectors that facilitate electrical continuity across each connected section of coiled tubing 20, as described in more detail below. In some embodiments, insert assembly 200 includes internal alignment elements that allow for a blind connection with connector 100, as described in more detail below.

In some embodiments, as shown, for example, in FIG. 2, the outer diameter of each section of coiled tubing 20, the outer diameter of insert assemblies 200, and the outer diameter of connector 100 are equal. In some embodiments, a portion of connector 100 (e.g., arms 140) may have a smaller outer diameter. In some embodiments, the uniform outer diameter between components of coiled tubing system 10 facilitates passing coiled tubing system 10 through injector 340 (see FIG. 10) for installing coiled tubing system 10 into a drilling well.

Figure 3:
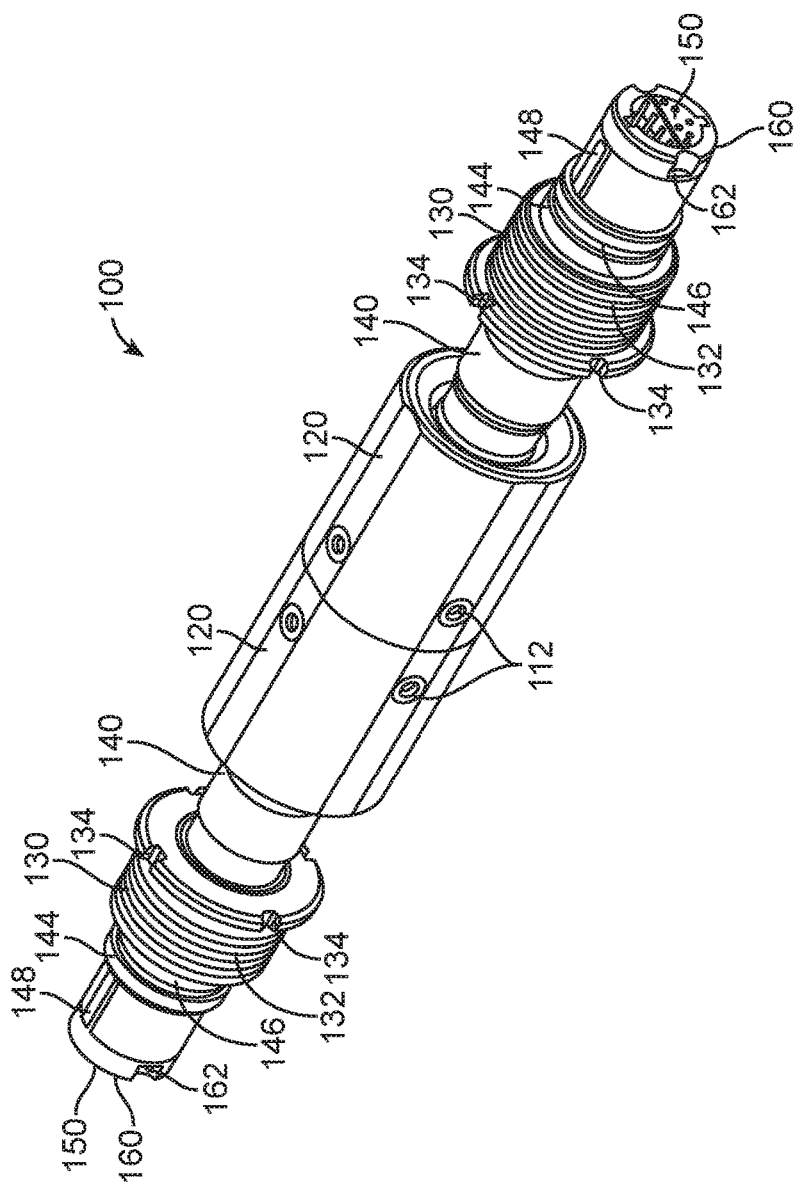
FIG. 3 illustrates a ball socket connector for a coiled tubing system according to some embodiments.
Figure 4:
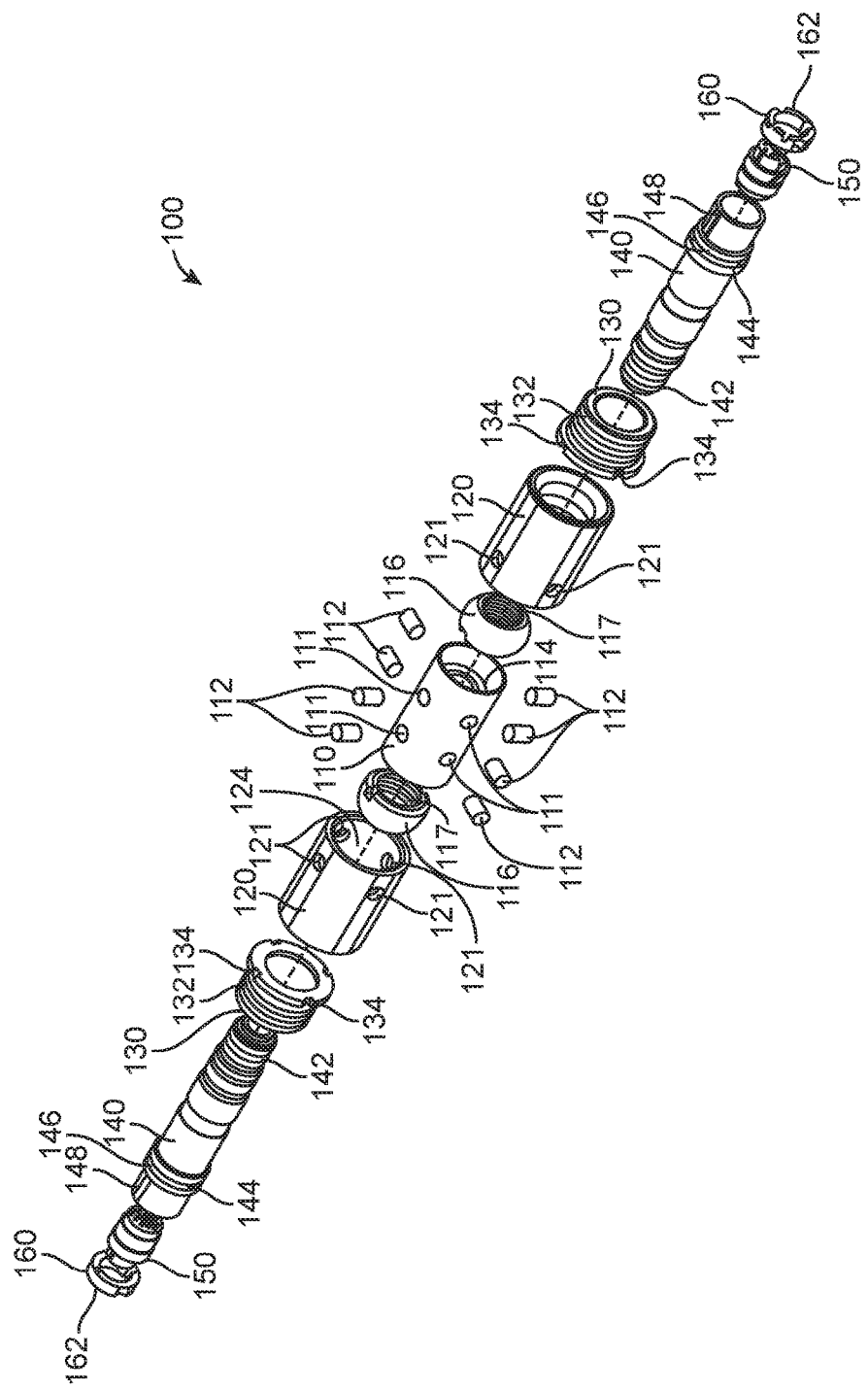
FIG. 4 illustrates an exploded view of a ball socket connector for a coiled tubing system according to some embodiments.

In some embodiments, connector 100 includes a ball socket connector, as shown, for example, in FIGS. 3 and 4. For example, connector 100 (e.g., ball socket connector) may include one or more ball socket joints formed by a ball 116 disposed within two concave socketed parts: casing 110 and cap 120. Arm 140 may be attached to ball 116, thus allowing arm 140 to rotate on and pivot with respect to the longitudinal axis of connector 100. In some embodiments, other types of connectors, for example a hinged connector, may be used as connector 100.

FIG. 3 shows a perspective view of connector 100 and FIG. 4 shows an exploded view of connector 100. In some embodiments, connector 100 includes casing 110, cap 120, threaded nut 130, arm 140, electrical connector 150, and front casing 160. In some embodiments, as shown in FIGS. 3 and 4, connector 100 is symmetrical such that it has two caps 120, two threaded nuts 130, two arms 140, two electrical connectors 150, and two front casings 160.

In some embodiments, connector 100 (e.g., ball socket connector) includes casing 110. In some embodiments, casing 110 may have a cylindrical shape. In some embodiments, the outer diameter of casing 110 may be less than the outer diameter of sections of coiled tubing 20. In some embodiments, casing 110 forms one of the concave socketed parts. In some embodiments, casing 110 includes a recess or ball socket 114. In some embodiments, casing 110 includes two ball sockets 114 with one on each end. In some embodiments, ball socket 114 is configured to receive ball 116. In some embodiments, casing 110 defines dowel holes 111 configured to receive dowel pins 112 to secure cap 120 to casing 110.

In some embodiments, connector 100 (e.g., ball socket connector) includes cap 120. In some embodiments, cap 120 may have a cylindrical shape. In some embodiments, the outer diameter of cap 120 may be equal to the outer diameter of sections of coiled tubing 20. In some embodiments, cap 120 forms the other concave socketed part. In some embodiments, cap 120 includes a recess or ball socket 124. In some embodiments, ball socket 124 is configured to receive ball 116. In some embodiments, ball socket 124 is configured to receive casing 110. Thus, an inner diameter of ball socket 124 may be greater than the outer diameter of casing 110. In some embodiments, cap 120 defines dowel holes 121 configured to receive dowel pins 112 to secure cap 120 to casing 110.

Thus, in some embodiments, casing 110, ball 116, and cap 120 form a ball socket joint. With dowel pins 112 inserted in dowel holes 121 of cap 120 and dowel holes 111 of casing 110, ball 116 is disposed between casing 110 and cap 120. In some embodiments, casing 110 and cap 120 secure ball 116 so that it does not experience translational movement. In some embodiments, an outer surface of ball 116 (or at least a portion thereof) is spherical. In some embodiments, ball socket 124 and/or ball socket 114 has an interior surface that is spherical to correspond to the outer surface of ball 116. Thus, while ball 116 is secured so that it does not experience translational movement, ball 116 may experience rotational movement in any direction.

In some embodiments, ball 116 includes internal threads 117 configured to receive a threaded portion 142 of arm 140. The attachment between arm 140 and ball 116 may allow arm 140 to rotate on its longitudinal axis and pivot with respect to the longitudinal axis of connector 100 in any direction. In some embodiments, arm 140 may pivot up to 9 degrees with respect to the longitudinal axis of connector 100. Thus, with an arm 140 on each end of connector 100, connector 100 may experience a total of 18 degrees of flexure (i.e., two ends pivoting 9 degrees with respect to the longitudinal axis of connector 100) without flexing or bending (i.e., experiencing bending stress or strain). In some embodiments, arm 140 may pivot up to 18 degrees with respect to the longitudinal axis of connector 100. Thus, with an arm 140 on each end of connector 100, connector 100 may experience a total of 36 degrees of flexure (i.e., two ends pivoting 18 degrees with respect to the longitudinal axis of connector 100) without flexing or bending (i.e., experiencing bending stress or strain). This may allow connector 100 to be spooled onto reel 12 without inducing bending stress.

In some embodiments, the pivot angle of connector 100 depends on the size of one or more features of coiled tubing system 10. In some embodiments, the pivot angle of connector 100 depends on the size of electrical connector 150 and/or the diameter of the section of coiled tubing 20. For example, if the size of electrical connector 150 is decreased, connector 100 can be configured to allow a greater pivot angle. As another example, if sections of coiled tubing 20 have a larger diameter, the pivot angle can also be increased. In some embodiments, the size of electrical connector 150 and section of coiled tubing 20 may determine the physical dimensions of connector 100, which may influence the pivot angle.

Figure 5A:
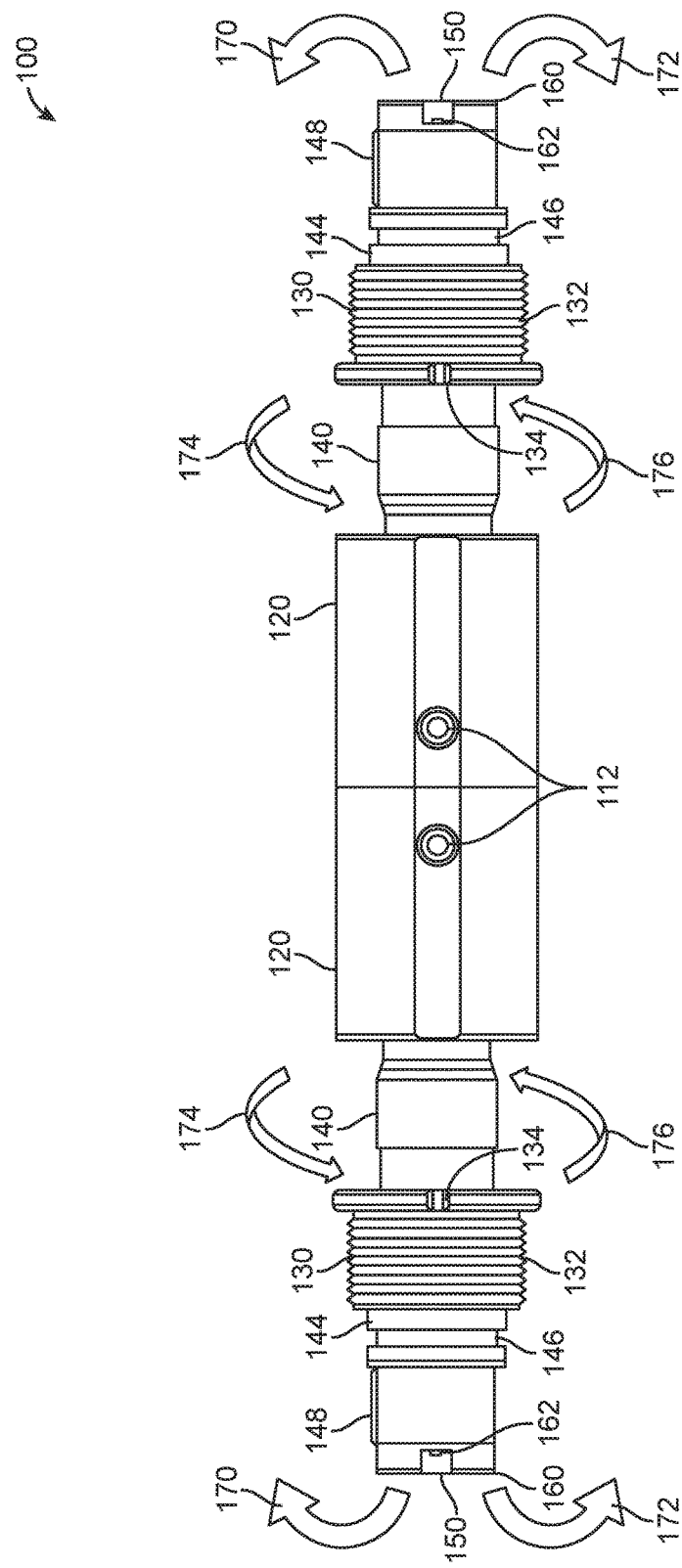
FIG. 5A illustrates a ball socket connector for a coiled tubing system in a first position according to some embodiments.
Figure 5B:
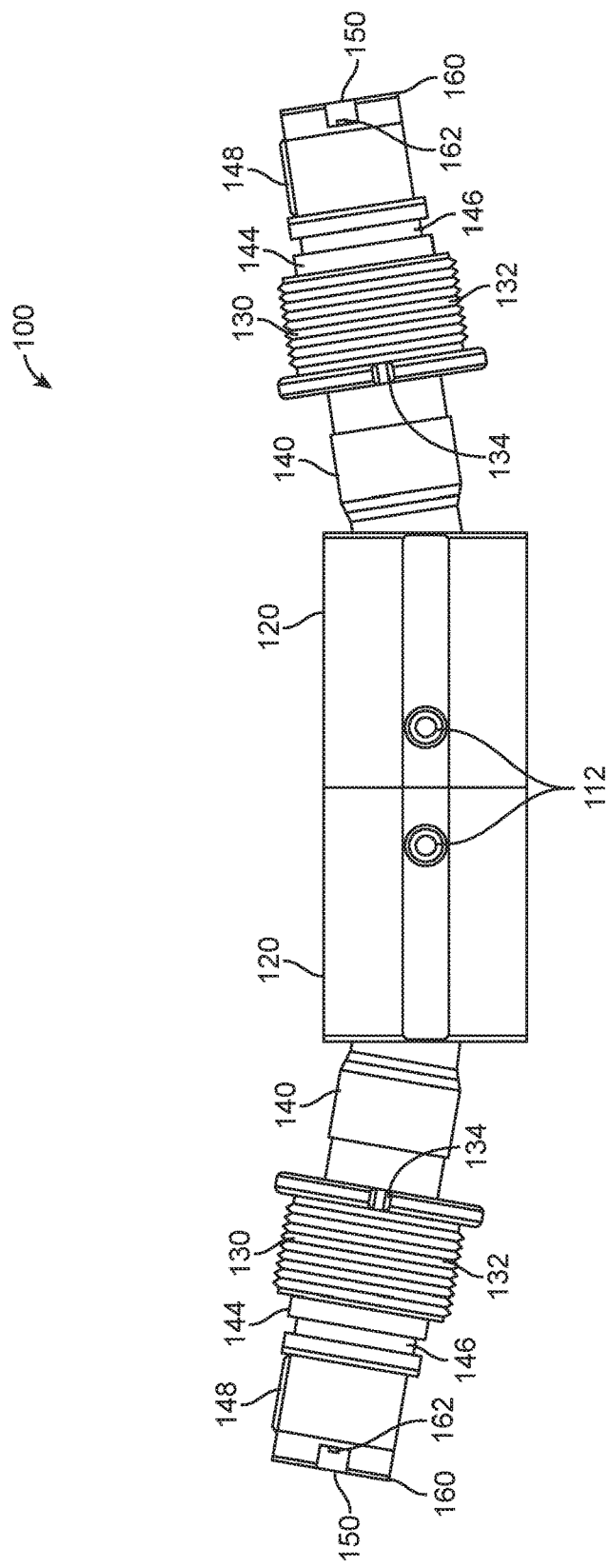
FIG. 5B illustrates a ball socket connector for a coiled tubing system in a second position according to some embodiments.
Figure 5C:
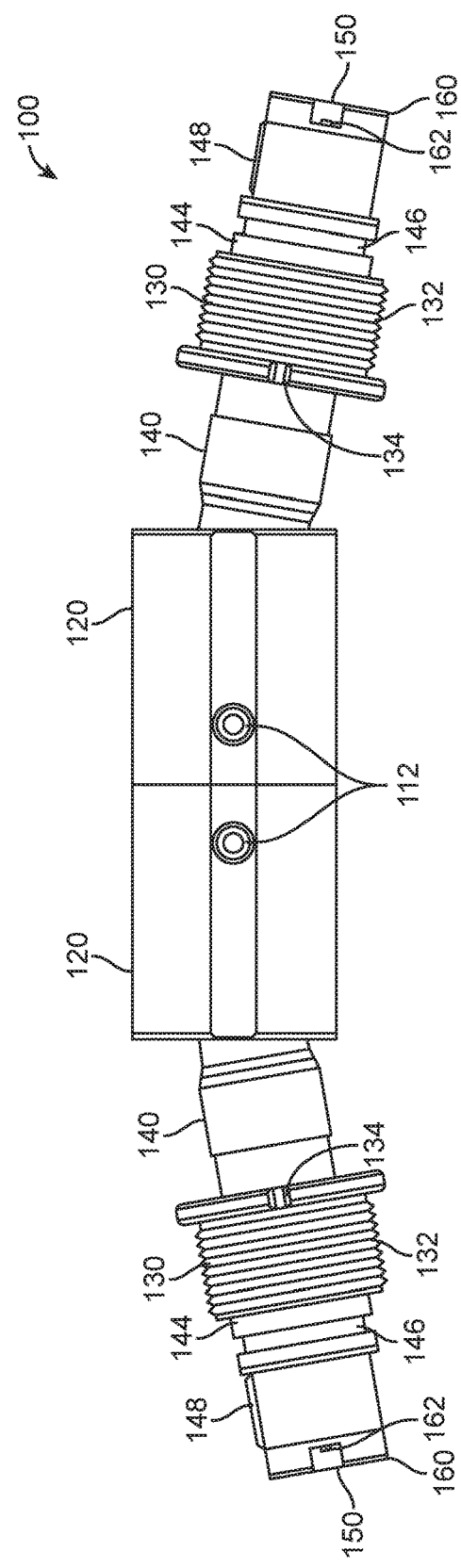
FIG. 5C illustrates a ball socket connector for a coiled tubing system in a third position according to some embodiments.

The functionality of ball socket joints formed by casing 110, cap, 120, and ball 116 that allows for the movement of arms 140 may be further explained with reference to FIGS. 5A-5C. As shown in FIG. 5A with pivot arrows 170 and 172, for example, arms 140 may pivot up in the direction of pivot arrow 170 (e.g., up to 9 or 18 degrees from the longitudinal axis of connector 100) or down in the direction of pivot arrow 172 (e.g., up to 9 or 18 degrees from the longitudinal axis of connector 100). FIG. 5A illustrates arms 140 in a first position with no pivoting (i.e., arms 140 are on the longitudinal axis of connector 100). FIG. 5B illustrates arms 140 in a second position, pivoted up relative to the longitudinal axis of connector 100. Similarly, FIG. 5C illustrates arms 140 in a third position, pivoted down relative to the longitudinal axis of connector 100. While FIG. 5A only illustrates up and down pivot arrows 170 and 172, respectively, arms 140 may pivot in any other direction relative to the longitudinal axis of connector 100. For example, arms 140 may pivot in the horizontal direction (i.e., into or out of the page) or any direction between the horizontal direction and the vertical direction (i.e., up and down as illustrated in FIGS. 5B and 5C). Thus, arms 140 may pivot in any direction of the 360 degrees surrounding the longitudinal axis of connector 100. Further, the arms 140 need not pivot in the same direction. For example, one arm may pivot up while the other arm pivots down.

In addition to the capability of arms 140 to pivot with respect to the longitudinal axis of connector 100, arms 140 may also rotate on the longitudinal axis of arms 140 as shown, for example, by rotation arrows 174 and 176 in FIG. 5A. As shown by rotation arrows 174 and 176, arms 140 may rotate in either a clockwise or counterclockwise direction around the longitudinal axis of connector 100.

Returning to FIGS. 3 and 4, in some embodiments, arms 140 include a shoulder 144 spaced from threaded portion 142. In some embodiments, shoulder 144 is a portion of arm 140 that has a greater outer diameter than the rest of arm 140. In some embodiments, shoulder 144 is a portion of arm 140 that has a greater outer diameter than directly adjacent portions of arm 140. In some embodiments, arms 140 include grooves 146. In some embodiments, each groove 146 is configured to receive an O-ring, which may provide a seal between connector 100 and insert assembly 200. In some embodiments, the end of arms 140 disposed away from the ball socket joint (formed by casing 110, cap 120, and ball 116) is configured to mate with insert assembly 200. For example, arms 140 may include an alignment feature 148. In some embodiments alignment feature 148 corresponds to a portion of insert assembly 200. In some embodiments, alignment feature 148 may allow for a blind connection between connector 100 and insert assembly 200. For example, a user may be able to attach connector 100 to insert assembly 200 without seeing the point at which they connect because alignment feature 148 only allows attachment at the proper alignment (i.e., alignment feature 148 only slides into place when connector 100 is properly aligned with insert assembly 200).

In some embodiments, connector 100 includes a threaded nut 130 disposed on each arm 140. In some embodiments, each threaded nut 130 is configured to attach to insert assembly 200. For example, threaded nut 130 may include threads 132 configured to thread with a corresponding threaded portion of insert assembly 200. In some embodiments, each threaded nut 130 is configured to rotate freely on arm 140 (i.e., rotate in both a clockwise and a counterclockwise direction without reaching a stopping point). In some embodiments, each threaded nut 130 is configured to experience translational movement along the longitudinal axis of arm 140. In some embodiments, threaded nut 130 is configured to move along the longitudinal axis of arm 140 between shoulder 144 of arm 140 and the ball socket joint formed by casing 110, cap 120, and ball 116.

In some embodiments, threaded nut 130 includes notches 134. Notches 134 may allow for a tool, such as a spanner wrench or other tool, to secure threaded nut 130 during the threading process with insert assembly 200.

In some embodiments, connector 100 includes electrical connectors 150. In some embodiments, electrical connectors 150 are disposed on each end of connector 100. In some embodiments, electrical connectors 150 are housed inside each arm 140. In some embodiments, electrical connectors 150 provide for electrical continuity in coiled tubing system 10 when connector 100 is attached to opposing sections of coiled tubing 20 (e.g., via insert assembly 200).

In some embodiments, connector 100 includes front casings 160. In some embodiments, front casings 160 are disposed on each end of connector 100. In some embodiments, front casings 160 are configured to secure electrical connectors 150 within arm 140. For example, screws 162 may secure front casings 160 to arm 140 such that electrical connector 150 is secured to arm 140.

In some embodiments, connector 100 attaches to insert assembly 200. In some embodiments, insert assembly 200 is attached to an end of a section of coiled tubing 20. In some embodiments, insert assembly 200 is welded to an end of a section of coiled tubing 20. In some embodiments, insert assembly 200 is configured to attach to either connector 100 or a downhole tool for a drilling well. Thus, connector 100 or a downhole tool may be attached to a section of coiled tubing 20 via insert assembly 200. In some embodiments, the attachment between connector 100 or a downhole tool and a section of coiled tubing 20 via insert assembly 200 is a threaded attachment.

Insert assembly 200 is shown, for example, in FIGS. 6-9. In some embodiments, insert assembly 200 includes a coiled tubing insert 210. In some embodiments, coiled tubing insert 210 forms the outer portion of insert assembly 200. In some embodiments, coiled tubing insert 210 includes an exposed portion 211 and an inserted portion 215.

In some embodiments, exposed portion 211 has an outer diameter that is equal to the outer diameter of each section of coiled tubing 20. In some embodiments, the uniform diameter between each section of coiled tubing and exposed portion 211 of coiled tubing insert 210 allows coiled tubing system 10 to pass over a gooseneck track 330 and pass through an injector 340 more smoothly (see FIG. 10). In some embodiments, exposed portion 211 includes threads 212 disposed on an inner side of exposed portion 211. In some embodiments, threads 212 are configured to interface with threads 132 on threaded nut 130.

In some embodiments, inserted portion 215 may be configured to fit within a section of coiled tubing 20. In some embodiments, inserted portion 215 includes a tapered end 214 disposed away from exposed portion 211. In some embodiments, tapered end 214 relieves stress from acting on an inner wall of the section of coiled tubing 20. For example, because tapered end 214 may be narrower than other portions of coiled tubing insert 210, tapered end 214 will induce less stress on the inner wall of the section of coiled tubing 20 as the section of coiled tubing 20 is bent. In some embodiments, tapered end 214 includes slots 216 that may be cut out of inserted portion 215. Slots 216 may also contribute to relieving stress on the inner wall of the section of coiled tubing 20. For example, slots 216 in conjunction with tapered end 214 being narrower allow for this part of insert assembly 200 to bend instead of inducing bending stress in the section of coiled tubing 20 as the section of coiled tubing 20 bends. In some embodiments, tapered end 214 includes at least two slots 216 spaced from each other. In some embodiments, tapered end 214 includes at least four slots 216 spaced from each other. More or fewer slots 216 may be included in tapered end 214. In some embodiments, slots 216 are equally spaced from each other.

In some embodiments, coiled tubing insert 210 includes a chamfer 218 disposed between exposed portion 211 and inserted portion 215. In some embodiments, chamfer 218 is welded to the section of coiled tubing 20.

Figure 7:
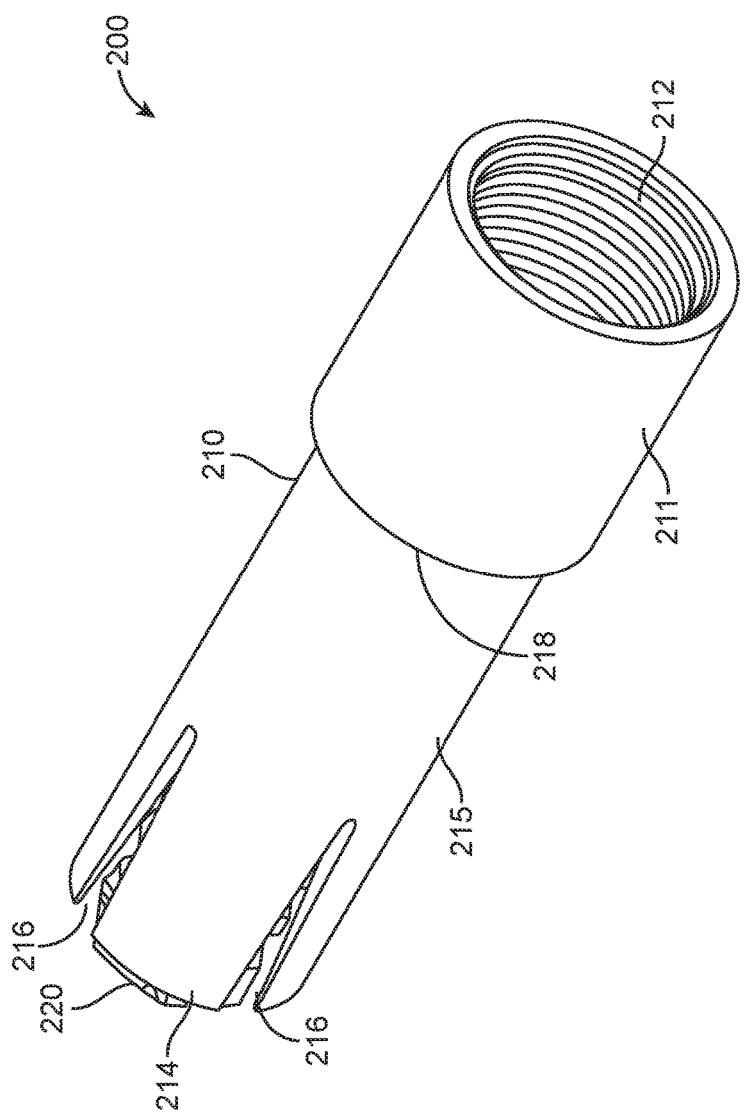
FIG. 7 illustrates an insert assembly for a coiled tubing system according to some embodiments.
Figure 8:
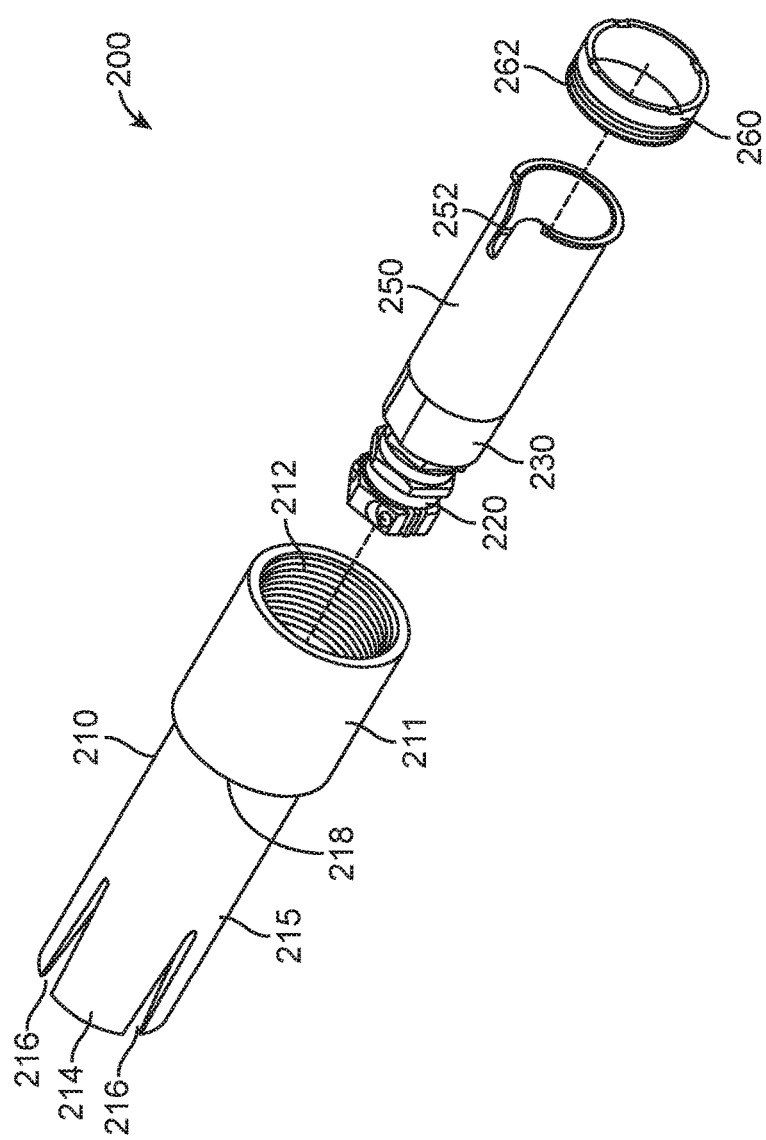
FIG. 8 illustrates an exploded view of an insert assembly for a coiled tubing system according to some embodiments.
Figure 9:
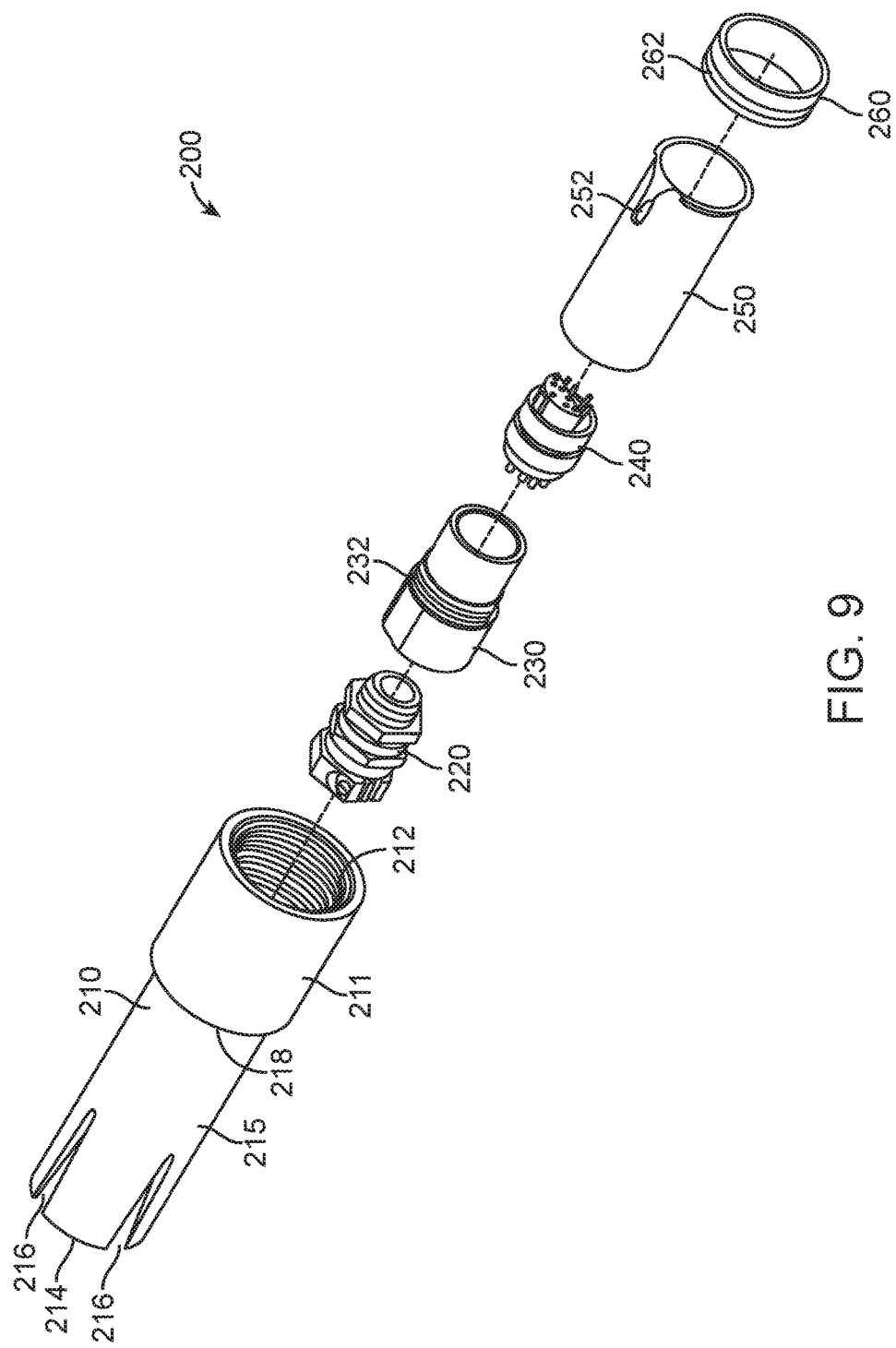
FIG. 9 illustrates an exploded view of an insert assembly for a coiled tubing system according to some embodiments.

In some embodiments, coiled tubing insert 210 houses other components of insert assembly 200, as shown, for example, in FIGS. 6 and 7. For example, coiled tubing insert 210 may house a cable strain relief grip 220, a strain relief adapter 230, an electrical connector 240, an insert swivel 250, and/or a swivel retaining ring 260.

In some embodiments, cable strain relief grip 220 is disposed at or adjacent to tapered end 214 when insert assembly 200 is assembled. In some embodiments, cable strain relief grip 220 grips onto a portion of the section of coiled tubing 20 (e.g., via clamping). This may relieve tension on electrical solder connections within electrical connector 240. For example, cable strain relief grip 220 relocates the location of tension by gripping or clamping onto a portion of the section of coiled tubing 20 away from electrical connector 240.

In some embodiments, cable strain relief grip 220 is attached to strain relief adapter 230 within coiled tubing insert 210. In some embodiments, strain relief adapter 230 may support an electrical connector 240. In some embodiments, electrical connector 240 is configured to connect with electrical connector 150. Thus, in some embodiments, electrical connector 240 may allow for electrical continuity in coiled tubing system 10 when connector 100 is attached to opposing sections of coiled tubing 20 (e.g., via insert assembly 200).

In some embodiments, strain relief adapter 230 attaches to and is partially housed within insert swivel 250. For example, strain relief adapter 230 may include threads 232 to interface with a threaded portion of insert swivel 250. In some embodiments, insert swivel 250 houses part of strain relief adapter 230 and electrical connector 240. In some embodiments, insert swivel 250, together with threads 212, forms a connection interface with connector 100. In some embodiments, insert swivel 250 allows for radial alignment with connector 100 or a downhole tool. For example, insert swivel 250 may include an alignment feature 252. In some embodiments, alignment feature 252 facilitates a blind connection with connector 100 or a downhole tool. In some embodiments, alignment feature 252 interacts with alignment feature 148 of arm 140. In some embodiments, alignment feature 252 includes a slot configured to receive alignment feature 148, which may be a projection. In some embodiments, alignment feature 252 includes a projection and alignment feature 148 comprises a slot. Other types of interfaces may be used for alignment features 252 and 148.

In some embodiments, insert swivel 250 is held in place with swivel retaining ring 260. In some embodiments, swivel retaining ring 260 surrounds insert swivel 250 to hold insert swivel 250 in place. In some embodiments, swivel retaining ring 260 may include threads 262 that interact with a threaded portion of coiled tubing insert 210. With insert assembly 200 attached to an end of a section of coiled tubing 20 and having electrical connector 240, insert swivel 250, and threads 212, connector 100 or a downhole tool can be easily attached to or removed from sections of coiled tubing 20.

The configuration of coiled tubing system 10 described above may facilitate use of coiled tubing system 10 in drilling wells. In some embodiments, as shown, for example, in FIG. 10, coiled tubing system 10 may be used on a work service rig 300. Work service rig 300 may be used to store, transport, install, and/or remove coiled tubing system 10. In some embodiments, work service rig 300 may include a control center 310 for controlling work service rig 300. In some embodiments, work service rig 300 supports reel 12. In some embodiments, work service rig 300 includes a mast 320. Mast 320 may include gooseneck track 330, injector 340, support block 350, operator platform 360, and/or tool storage unit 370.

In some embodiments, gooseneck track 330 feeds coiled tubing system 10 from reel 12 to injector 340. In some embodiments, injector 340 installs coiled tubing system 10 into a drilling well. In some embodiments, coiled tubing system 10 passes through support block 350. In some embodiments, support block 350 may secure coiled tubing system 10 to support the portion of coiled tubing system 10 that already passed through support block 350 while an operator on operator platform 360 removes connector 100 from between two sections of coiled tubing 20 and installs a downhole tool from tool storage unit 370 to be inserted into the drilling well. Connectors 100 may also be stored in tool storage unit 370 until they are reinstalled in place of a downhole tool as coiled tubing system 10 is removed from the drilling well.

Accordingly, in some embodiments, components described above may be used to prepare coiled tubing system 10 for use in a drilling well. In some embodiments, a first insert assembly 200 is attached to a first section of coiled tubing 20. In some embodiments, a second insert assembly 200 is attached to a second section of coiled tubing. In some embodiments, a connector 100 is attached to the first and second insert assemblies 200. In some embodiments, connector 100 includes a ball socket joint formed by casing 110, cap 120, and ball 116, as described above.

In some embodiments, the first section of coiled tubing 20, the connector 100, and the second section of coiled tubing 20 may be spooled onto reel 12. This may include the first and second insert assemblies 200. In some embodiments, additional insert assemblies 200, sections of coiled tubing 20, and connectors 100 may be attached to each other in a similar manner, thus creating a series of sections of coiled tubing 20 and connectors 100 to form coiled tubing system 10.

In some embodiments, connector 100 provides electrical continuity between the first and second sections of coiled tubing 20. In some embodiments, electrical continuity extends throughout the entire coiled tubing system 10.

In some embodiments, attaching the first and second insert assemblies to the first and second sections of coiled tubing 20, respectively, includes welding the first and second insert assemblies to the first and second sections of coiled tubing 20, respectively. In some embodiments, attaching connector 100 to the first and second insert assemblies 200 includes removably attaching connector 100 to the first and second insert assemblies 200. For example, connector 100 may be threaded into first and second insert assemblies 200.

In some embodiments, preparing coiled tubing system 10 for use in a drilling well includes passing sections of coiled tubing 20 (and insert assemblies 200) and connector 100 through injector 340. In some embodiments, preparing coiled tubing system 10 for use in a drilling well includes unspooling sections of coiled tubing 20 (and insert assemblies 200) and connector 100 from reel 12. In some embodiments, connector 100 is replaced with a downhole tool for a drilling well. For example, connector 100 may be unthreaded from insert assemblies 200 and a downhole tool may be threaded into insert assemblies 200 in its place.

The foregoing description has been presented for purposes of illustration and description. It is not intended to be exhaustive or to limit the precise embodiments disclosed. Other modifications and variations may be possible in light of the above teachings.

The embodiments and examples were chosen and described in order to best explain the principles of the embodiments and their practical application, and to thereby enable others skilled in the art to best utilize the various embodiments with modifications as are suited to the particular use contemplated. By applying knowledge within the skill of the art, others can readily modify and/or adapt for various applications such specific embodiments, without undue experimentation, without departing from the general concept. Therefore, such adaptations and modifications are intended to be within the meaning and range of equivalents of the disclosed embodiments, based on the teaching and guidance presented herein.

What is claimed is:

1. A coiled tubing system comprising:
a first section of coiled tubing having a distal end;
a second section of coiled tubing having a proximal end;
a first insert assembly attached at the distal end of the first section of coiled tubing;
a second insert assembly attached at the proximal end of the second section of coiled tubing; and
a connector disposed between the first and second sections of coiled tubing and removably coupled to the distal end of the first section and the proximal end of the second section by the first and second insert assemblies,
wherein the connector is configured for re-coupling to the distal end of the first section and to the proximal end of the second section by the first and second insert assemblies, and
wherein a portion of the connector is configured to pivot with respect to a longitudinal axis of the connector.

2. The coiled tubing system of claim 1, further comprising:
a third insert assembly attached at an opposite end of the second section of coiled tubing from the second insert assembly;
a third section of coiled tubing;
a fourth insert assembly attached at an end of the third section of coiled tubing; and
a second connector disposed between the second and third sections of coiled tubing and removably coupled to the third and fourth insert assemblies,
wherein a portion of the second connector is configured to pivot with respect to a longitudinal axis of the second connector.

3. The coiled tubing system of claim 1, wherein the connector comprises a ball socket connector.

4. The coiled tubing system of claim 1, wherein the portion of the connector configured to pivot comprises an arm and a ball socket joint.

5. The coiled tubing system of claim 1, wherein the portion of the connector configured to pivot comprises each end of the connector, and
wherein each end of the connector is configured to pivot up to 18 degrees with respect to the longitudinal axis of the connector.

6. The coiled tubing system of claim 5, wherein each end of the connector is configured to pivot up to 9 degrees with respect to the longitudinal axis of the connector.

7. The coiled tubing system of claim 1, wherein an outer diameter of the first and second sections of coiled tubing, an outer diameter of the first and second insert assemblies, and an outer diameter of the connector are equal.

8. The coiled tubing system of claim 1, wherein the first and second insert assemblies each comprise:
a tapered first end configured to be disposed within the coiled tubing;
a second end configured to receive the connector; and
a swiveling insert disposed within the insert assembly, the swiveling insert having an electrical connector and an alignment element disposed adjacent the second end, wherein the alignment element is configured to align with a portion of the connector.

9. The coiled tubing system of claim 8, wherein the second end is further configured to receive a downhole tool for a drilling well.

10. A connector for joining sections of coiled tubing, the connector comprising:
a ball socket joint comprising:
a casing having a recess;
a ball disposed in the recess; and
a cap configured to secure the ball within the recess, wherein the ball is configured to move within the recess relative to the cap and the casing;
an arm attached to the ball socket joint and having a first end opposite the ball socket joint;
a nut disposed around the arm, the nut configured to removably attach to a section of coiled tubing; and
an electrical connector disposed at the first end of the arm.

11. The connector of claim 10, wherein the arm comprises a shoulder, and wherein the nut is configured to translate axially along the arm between the ball socket joint and the shoulder.

12. The connector of claim 10, wherein the nut is configured to rotate around the arm.

13. The connector of claim 10, wherein the nut is configured to removably attach to a section of coiled tubing via an insert assembly partially disposed in the section of the coiled tubing, and
wherein the nut comprises threading configured to mate with threading on the insert assembly.

14. The connector of claim 10, wherein the arm comprises an alignment element disposed at a first end of the arm configured to provide a blind connection between the connector and a section of coiled tubing.

15. The connector of claim 10, wherein the arm is configured to rotate on a longitudinal axis of the arm.

16. The connector of claim 10, wherein the arm is configured to pivot up to 9 degrees in any direction with respect to a longitudinal axis of the connector.

17. A method of preparing coiled tubing for use in a drilling well, the method comprising:
attaching a first insert assembly to a first section of coiled tubing;
attaching a second insert assembly to a second section of coiled tubing;
removably attaching a connector comprising a ball socket joint to the first insert assembly and the second insert assembly; and
spooling the first section of coiled tubing, the connector, and the second section of coiled tubing onto a reel,
wherein the connector is configured to be removed from the first insert assembly while the first insert assembly is attached to the first section of coiled tubing.

18. The method of claim 17, wherein the connector provides electrical continuity between the first and second sections of coiled tubing.

19. The method of claim 17, wherein attaching the first insert assembly to the first section of coiled tubing comprises welding the first insert assembly to the first section of coiled tubing, and
  wherein attaching the second insert assembly to the second section of coiled tubing comprises welding the second insert assembly to the second section of coiled tubing.

20. The method of claim 17, further comprising:
  passing the first section of coiled tubing, the connector, and the second section of coiled tubing through an injector.

21. The method of claim 17, further comprising:
  unspooling the first section of coiled tubing, the connector, and the second section of coiled tubing; and
  replacing the connector with a downhole tool for a drilling well.

* * * * *